United States Patent
Rosenberg et al.

(10) Patent No.: US 8,810,524 B1
(45) Date of Patent: Aug. 19, 2014

(54) TWO-SIDED TOUCH SENSOR

(75) Inventors: Ilya D. Rosenberg, Mountain View, CA (US); Julien G. Beguin, San Francisco, CA (US); Tomer Moscovich, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 560 days.

(21) Appl. No.: 12/846,328

(22) Filed: Jul. 29, 2010

Related U.S. Application Data

(60) Provisional application No. 61/263,032, filed on Nov. 20, 2009.

(51) Int. Cl.
*G06F 3/041* (2006.01)

(52) U.S. Cl.
USPC ............. 345/173; 345/1.1; 345/1.3; 345/156; 345/174

(58) Field of Classification Search
CPC . G06F 1/1616; G06F 3/04883; G06F 1/1641; G06F 1/1647; G06F 1/1626
USPC ............................. 345/1.1, 1.3, 156, 173–174
See application file for complete search history.

(56) References Cited

U.S. PATENT DOCUMENTS

| | | | |
|---|---|---|---|
| 3,944,740 A | 3/1976 | Murase et al. | |
| 4,526,043 A | 7/1985 | Boie et al. | |
| 4,587,378 A | 5/1986 | Moore | |
| 4,952,031 A | 8/1990 | Tsunoda et al. | |
| 4,983,786 A | 1/1991 | Stevens | |
| 5,105,548 A | 4/1992 | Fowler | |
| 5,543,589 A | 8/1996 | Buchana et al. | |
| 5,597,183 A * | 1/1997 | Johnson | 283/83 |
| 5,666,113 A | 9/1997 | Logan | |
| 5,761,485 A * | 6/1998 | Munyan | 715/839 |
| 5,818,430 A | 10/1998 | Heiser | |
| 5,825,352 A | 10/1998 | Bisset et al. | |
| 5,847,698 A * | 12/1998 | Reavey et al. | 345/173 |
| 6,072,474 A | 6/2000 | Morimura et al. | |
| 6,128,007 A | 10/2000 | Seybold | |
| 6,229,502 B1 * | 5/2001 | Schwab | 345/1.1 |
| 6,392,636 B1 | 5/2002 | Ferrari et al. | |
| 6,594,606 B2 | 7/2003 | Everitt | |

(Continued)

FOREIGN PATENT DOCUMENTS

| | | |
|---|---|---|
| JP | 09282100 | 10/2007 |
| WO | WO2007/141566 A2 | 12/2007 |
| WO | WO2009/008568 A1 | 1/2009 |
| WO | WO2009/021836 A1 | 2/2009 |

OTHER PUBLICATIONS

Moscovich, et al., "Multi-finger Cursor Techniques", Department of Computer Science, Brown University, Year of Publication: 2006, 7 pages.

(Continued)

*Primary Examiner* — Gregory J Tryder
*Assistant Examiner* — Peter D McLoone
(74) *Attorney, Agent, or Firm* — Lee & Hayes, PLLC

(57) ABSTRACT

Touch sensors sensitive to touches on two sides are incorporated into electronic devices and accept input from either side of the device, such as a front and a back of the device. This increases available input area without doubling the number of touch sensors within the device. When combined with one or more displays, low profile two-sided devices are possible.

25 Claims, 15 Drawing Sheets

(56) References Cited

U.S. PATENT DOCUMENTS

| | | | |
|---|---|---|---|
| 6,762,752 B2 | 7/2004 | Perski et al. | |
| 6,980,202 B2 | 12/2005 | Carro | |
| 6,982,699 B1 | 1/2006 | Lenssen et al. | |
| 7,123,243 B2* | 10/2006 | Kawasaki et al. | 345/173 |
| 7,166,966 B2 | 1/2007 | Naugler, Jr. et al. | |
| 7,190,348 B2 | 3/2007 | Kennedy et al. | |
| 7,199,322 B2* | 4/2007 | Bourdelais et al. | 200/512 |
| 7,324,093 B1* | 1/2008 | Gettemy et al. | 345/173 |
| 7,339,577 B2 | 3/2008 | Sato et al. | |
| 7,619,616 B2 | 11/2009 | Rimas Ribikauskas et al. | |
| 7,760,187 B2 | 7/2010 | Kennedy | |
| 7,800,586 B2 | 9/2010 | Serban et al. | |
| 7,825,905 B2 | 11/2010 | Philipp | |
| 8,089,470 B1 | 1/2012 | Schediwy et al. | |
| 8,223,278 B2 | 7/2012 | Kim et al. | |
| 8,243,424 B1* | 8/2012 | Babu et al. | 361/679.01 |
| 8,265,717 B2* | 9/2012 | Gorsica et al. | 455/575.3 |
| 8,316,324 B2 | 11/2012 | Boillot | |
| 2001/0013855 A1 | 8/2001 | Fricker et al. | |
| 2002/0015024 A1 | 2/2002 | Westerman et al. | |
| 2002/0149572 A1 | 10/2002 | Schulz et al. | |
| 2002/0180714 A1 | 12/2002 | Duret | |
| 2003/0067449 A1 | 4/2003 | Yoshikawa et al. | |
| 2003/0156098 A1 | 8/2003 | Shaw et al. | |
| 2003/0210235 A1 | 11/2003 | Roberts | |
| 2003/0234768 A1* | 12/2003 | Rekimoto et al. | 345/169 |
| 2004/0125087 A1 | 7/2004 | Taylor et al. | |
| 2004/0174324 A1 | 9/2004 | Yamazaki et al. | |
| 2005/0083316 A1 | 4/2005 | Brian et al. | |
| 2005/0200798 A1 | 9/2005 | Tanaka | |
| 2005/0259087 A1 | 11/2005 | Hoshino et al. | |
| 2006/0012580 A1 | 1/2006 | Perski et al. | |
| 2006/0028459 A1 | 2/2006 | Underwood et al. | |
| 2006/0050062 A1 | 3/2006 | Ozawa et al. | |
| 2006/0097991 A1 | 5/2006 | Hotelling et al. | |
| 2006/0109252 A1 | 5/2006 | Kolmykov-Zotov et al. | |
| 2006/0192726 A1* | 8/2006 | Huitema et al. | 345/1.1 |
| 2006/0198080 A1 | 9/2006 | Hawes et al. | |
| 2006/0209045 A1 | 9/2006 | Su et al. | |
| 2006/0244735 A1 | 11/2006 | Wilson | |
| 2006/0293864 A1 | 12/2006 | Soss | |
| 2007/0152976 A1 | 7/2007 | Townsend et al. | |
| 2007/0236618 A1 | 10/2007 | Maag et al. | |
| 2008/0018611 A1 | 1/2008 | Serban et al. | |
| 2008/0074400 A1* | 3/2008 | Gettemy et al. | 345/173 |
| 2008/0143679 A1 | 6/2008 | Harmon et al. | |
| 2008/0158183 A1 | 7/2008 | Hotelling et al. | |
| 2008/0160656 A1 | 7/2008 | Chanda et al. | |
| 2008/0168403 A1 | 7/2008 | Westerman et al. | |
| 2008/0180406 A1 | 7/2008 | Han et al. | |
| 2008/0246723 A1 | 10/2008 | Baumbach | |
| 2008/0254822 A1 | 10/2008 | Tilley | |
| 2008/0296073 A1 | 12/2008 | McDermid | |
| 2008/0303799 A1 | 12/2008 | Schwesig et al. | |
| 2009/0102805 A1 | 4/2009 | Meijer et al. | |
| 2009/0120696 A1 | 5/2009 | Hayakawa et al. | |
| 2009/0174679 A1 | 7/2009 | Westerman | |
| 2009/0219258 A1 | 9/2009 | Geaghan et al. | |
| 2009/0227295 A1 | 9/2009 | Kim | |
| 2009/0237374 A1* | 9/2009 | Li et al. | 345/174 |
| 2009/0256817 A1 | 10/2009 | Perlin et al. | |
| 2009/0289914 A1 | 11/2009 | Cho | |
| 2010/0005427 A1 | 1/2010 | Zhang et al. | |
| 2010/0013797 A1 | 1/2010 | Kim et al. | |
| 2010/0020043 A1 | 1/2010 | Park et al. | |
| 2010/0090964 A1 | 4/2010 | Soo et al. | |
| 2010/0117974 A1 | 5/2010 | Joguet et al. | |
| 2010/0139990 A1 | 6/2010 | Westerman et al. | |
| 2010/0182285 A1 | 7/2010 | Tremblay | |
| 2010/0199221 A1 | 8/2010 | Yeung et al. | |
| 2010/0267421 A1 | 10/2010 | Rofougaran | |
| 2010/0277439 A1* | 11/2010 | Charlier et al. | 345/176 |
| 2010/0295781 A1 | 11/2010 | Alameh et al. | |
| 2010/0315373 A1* | 12/2010 | Steinhauser et al. | 345/174 |
| 2011/0007021 A1 | 1/2011 | Bernstein et al. | |
| 2011/0037709 A1 | 2/2011 | Cottarel et al. | |
| 2011/0061947 A1 | 3/2011 | Krah et al. | |
| 2011/0096033 A1 | 4/2011 | Ko | |
| 2011/0109577 A1 | 5/2011 | Lee et al. | |
| 2011/0242037 A1 | 10/2011 | Gruber | |
| 2011/0254864 A1 | 10/2011 | Tsuchikawa et al. | |
| 2012/0057064 A1 | 3/2012 | Gardiner et al. | |
| 2012/0084691 A1 | 4/2012 | Yun | |
| 2012/0105324 A1 | 5/2012 | Lee et al. | |
| 2012/0313880 A1 | 12/2012 | Geaghan et al. | |
| 2012/0320247 A1 | 12/2012 | Kim et al. | |

OTHER PUBLICATIONS

Ashbrook, et al., "Nenya: Subtle and Eyes-Free Mobile Input with a Magnetically-Tracked Finger Ring", CHI 2011, May 7-12, 2011, 4 pages.

Harrison, et al., "Abracadabra: Wireless, High-Precision, and Unpowered Finger Input for Very Small Mobile Devices", In Proceedings of the 22nd Annual ACM Symposium on User interface Software and Technology (Victoria, British Columbia, Canada, Oct. 4-7, 2009). UIST '09. ACM, New York, NY, 4 pages.

Non-Final Office Action for U.S. Appl. No. 12/846,497, mailed on Dec. 14, 2012, Ilya D. Rosenberg et al., "Capacitive Sensing with Interpolating Force-Sensitive Resistor Array", 26 pages.

Non-Final Office Action for U.S. Appl. No. 12/846,368, mailed on Feb. 15, 2013, Ilya D. Rosenberg et al., "Touch Distinction", 23 pages.

Office Action for U.S. Appl. No. 12/846,539, mailed on Feb. 15, 2013, Ilya D. Rosenberg et al., "Magnetic Touch Discrimination", 20 pages.

Non-Final Office Action for U.S. Appl. No. 13/247,669, mailed on Feb. 1, 2013, Julien G. Beguin et al., "Interacting Through Noncontact Gestures", 22 pages.

Office action for U.S. Appl. No. 12/846,519, mailed on Apr. 24, 2013, Rosenberg et al., "Touch Sensing Techniques", 23 pages.

Office action for U.S. Appl. No. 12/846,497, mailed on Apr. 25, 2013, Rosenberg et al., "Capacitive Sensing with Interpolating Force-Sensitive Resistor Array", 27 pages.

Office action for U.S. Appl. No. 12/846,295, mailed on May 21, 2013, Rosenberg et al., "Visually Consistent Arrays", 14 pages.

Office action for U.S. Appl. No. 12/846,268, mailed on May 3, 2013, Rosenberg et al., "Gestures and Touches on Force-sensitive Input Devices", 15 pages.

Final Office Action for U.S. Appl. No. 12/846,539, mailed on Oct. 25, 2013, Ilya D. Rosenberg, "Magnetic Touch Discrimination", 26 pages.

Office Action for U.S. Appl. No. 12/846,268, mailed on Oct. 23, 2013, Ilya D. Rosenberg, "Gestures and Touches on Force-sensitive Input Devices", 37 pages.

Office Action for U.S. Appl. No. 12/846,428, mailed on Oct. 9, 2013, Ilya D. Rosenberg, "Hardware Enabled Interpolating Sensor and Display", 25 pages.

Office action for U.S. Appl. No. 12/846,519, mailed on Nov. 14, 2013, Rosenberg, et al., "Touch Sensing Techniques", 24 pages.

Office action for U.S. Appl. No. 13/247,699, mailed on Jul. 19, 2013, Beguin et al., "Interacting Through Noncontact Gestures", 32 pages.

Office action for U.S. Appl. No. 12/846,328, mailed on Aug. 15, 2013, Rosenberg et al., "Two-Sided Touch Sensor", 18 pages.

Office action for U.S. Appl. No. 12/846,368, mailed on Sep. 13, 2013, Rosenberg et al., "Touch Distinction", 36 pages.

Wolf, et al., "Angles, Azimuths, and Bearings", Pearson Prentice Hall, Elementary Surveying, 12th Edition, 2008, Chapter 7, pp. 165-184.

Final Office Action for U.S. Appl. No. 12/846,295, mailed on Dec. 23, 2013, Ilya D. Rosenberg, "Visually Consistent Arrays including Conductive Mesh", 16 pages.

Office action for U.S. Appl. No. 12/846,428, mailed on Feb. 21, 2014, Rosenberg, et al., "Hardware Enabled Interpolating Sensor and Display", 30 pages.

Office Action for U.S. Appl. No. 13/247,699, mailed on Jan. 31, 2014, Julien G. Beguin, "Interacting Through Noncontact Gestures", 28 pages.

* cited by examiner

TWO-SIDED TOUCH SENSOR

PRIORITY

The present application claims priority to U.S. Provisional Application Ser. No. 61/263,032, filed on Nov. 20, 2009, entitled "Use of single touch sensor to accept input on both sides of a thin display or control panel." This application is hereby incorporated by reference in its entirety, and the benefit of the filing dates of this pending application is claimed to the fullest extent permitted.

BACKGROUND

Electronic devices are ubiquitous, and include cellular phones, eBook readers, tablet computers, desktop computers, portable media devices, and so forth. These electronic devices may utilize touch sensors for accepting user input.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
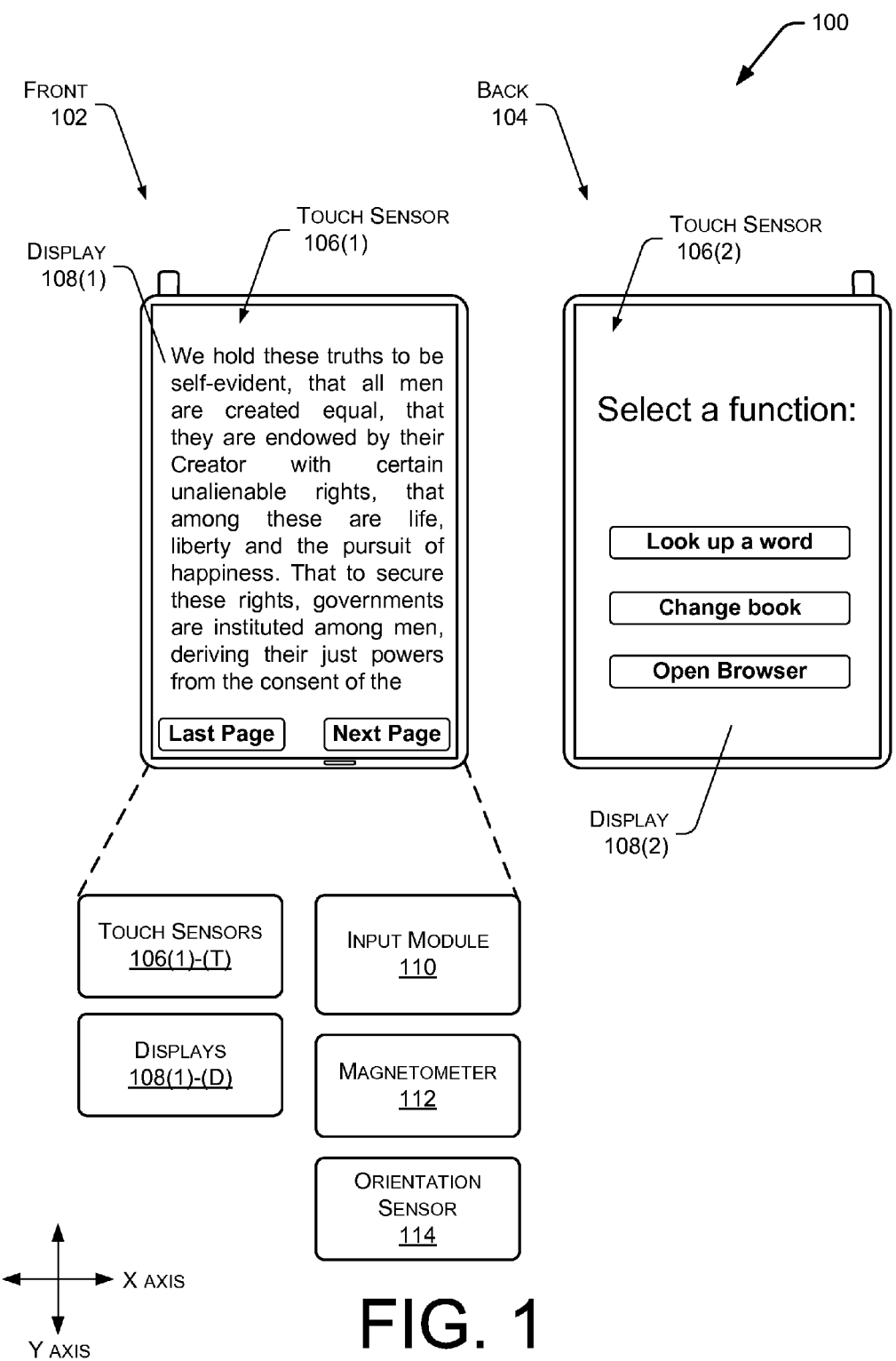
FIG. 1 depicts an electronic device configured with a two-sided touch sensor.

Described herein are devices and techniques for implementing a two-sided touch sensor which is capable of accepting touch input from a front side and a back side which are placed opposite one another. Also described herein are techniques for disambiguating a touch input to determine an originating side for a touch.

A two-sided touch sensor is configured to accept touches from a first side (such as the front), a second side (such as the back), or both. The two-sided touch sensor may be employed in dedicated low-profile input devices or in other electronic devices such as eBook readers, tablet computers, and so forth. In one implementation, the two-sided touch sensor may comprise an interpolating force-sensitive resistor (IFSR) sensor. The IFSR sensor may comprise a first touch sensor layer adjacent to and coincident with a second touch sensor layer. Each layer has an arrangement of force sensitive resistive material. When interrogated by a touch sensor controller, the IFSR sensor yields position, area, force, and other characteristics of an incident touch.

For illustrative purposes, and not by way of limitation, discussed herein are several configurations for implementing the two-sided touch sensor. In one configuration, a double-sided touch sensor accepts inputs from touches on either side. In another configuration, the two-sided touch sensor is combined with a display. The display may comprise an electrophoretic, liquid crystal, pre-printed image, and so forth. In yet another configuration, the two-sided touch sensor is sandwiched between two separate displays, allowing for two sided presentation and touch input.

In certain implementations, it is worthwhile to disambiguate the originating side of a touch. For example, areas associated with virtual touch controls (or "touch controls") may be present on the front side and the back side of the two-sided touch sensor. Where the areas do not overlap, no disambiguation is necessary. However, when the touch control areas overlap, it is worthwhile to determine whether the user intended to activate the touch control associated with the first side, or the touch control associated with the second side.

Shaped overlays permit disambiguation as to the originating side of the touch. A shaped overlay comprises a resilient material with shaped features disposed on one side. The shaped overlay is placed adjacent to and coincident with a side of the touch sensor, such that the shaped features will come into contact with the touch sensor upon application of an incident force. The shaped overlay transmits the incident force and presses on the touch sensor with the specific shape present in the shaped features. By analyzing the shape impinging on the touch sensor, the originating side is distinguishable. For example, suppose the shaped overlay contains shaped features which are square. When touches are received which comprise one or more squares having sizes corresponding to the shaped features, the touches may be determined as originating on the side having the overlay.

Other techniques may also be used to disambiguate the originating side of the touch. These techniques may determine the user's orientation relative to the device. An assumption may be made that the side of the device facing the user is most likely the side that the touch is associated with. Thus, by determining the orientation of the device relative to the user, the originating side of the touch may be determined.

Orientation may be determined in several ways. One way is to monitor how the user is holding the device. Given the physical arrangement of the user's hands and the known biomechanics of human hands, it is possible to determine a likely orientation of the device relative to the user based upon touches to the touch sensor. Orientation may also be established recognizing a user entered pre-determined asymmetrical gesture on the two-sided touch sensor which allows for disambiguation as to the orientation.

A magnetic ring worn by the user may also provide orientation information. A magnetometer within the device may detect a location of the magnetic ring, thus determining an orientation of the device relative to the user.

Environmental cues from orientation sensors may also be used to disambiguate the originating side of a touch. A proximity sensor may determine when a particular side of the device is close to another object such as a table versus which side is not. Light sensors or cameras may be used to determine orientation by utilizing the assumption that when observed light is below a certain pre-determined level, the side with the sensor is likely face down on a surface. Other sensors such as gravimeters, accelerometers, and so forth may be used to determine which side is up, and utilizing the assumption that the uppermost side is proximate to the user, determine the orientation of the device relative to the user.

Position sensors may also provide input useful to disambiguate the originating side. In one implementation, a touch sensor is attached to a hinge within a cover. A position sensor associated with the hinge indicates the relative position of the touch sensor within the cover. This relative position information allows to the disambiguation of which side is facing the user.

Illustrative Device

FIG. 1 depicts an electronic device 100 configured with a two-sided touch sensor. Two opposing sides 102 and 104 of the same device 100 are shown for discussion purposes. A first or front side 102 shows the touch sensor 106(1) which accepts input from a user. Also shown is a first display 108(1), which is configured to present information to the user such as a portion of an eBook and virtual touch control buttons to move to a last page and a next page. Upon activation, these touch controls may modify presentation of the eBook on the display 106(1).

The display 108 may include an electrophoretic display, liquid crystal display, and so forth as discussed in more depth below with regards to FIG. 2 below. In some implementations, such as shown here, the touch sensor 106 and the display 108 and may be combined to provide a touch-sensitive display, or touchscreen display. In such an arrangement, the touch sensor 106 component may be disposed behind the display 108 component, or vice versa.

The device 100 incorporates an input module 110 which coordinates input from the touch sensors 106(1)-(T). The input module 110 may utilize sensors such as a magnetometer 112, one or more orientation sensors 114, and so forth to determine the relative orientation between the device 100 and the user. Determination of the relative orientation allows the input module 110 to determine an originating side for a touch on the touch sensor 106. When the originating side is determined, touch inputs may be associated with the touch controls associated with the originating side.

A view of a second side or back 104 of the device 100 shows a second touch sensor 106(2). In some implementations touch sensor 106(2) and touch sensor 106(1) may be the same device, configured as a two-sided touch sensor. In other implementations, two touch sensors may be placed adjacent and coincident with one another to form a two-sided touch sensor. Also shown is a display 108(2) presenting a menu of touch controls for various functions including looking up a word, changing a book, and opening a browser. As described below with regards to FIGS. 4-6, the display 108(2) may comprise a single display configured to change presentation in accordance with which side is presented to the user, or may comprise two distinct displays.

Figure 2:
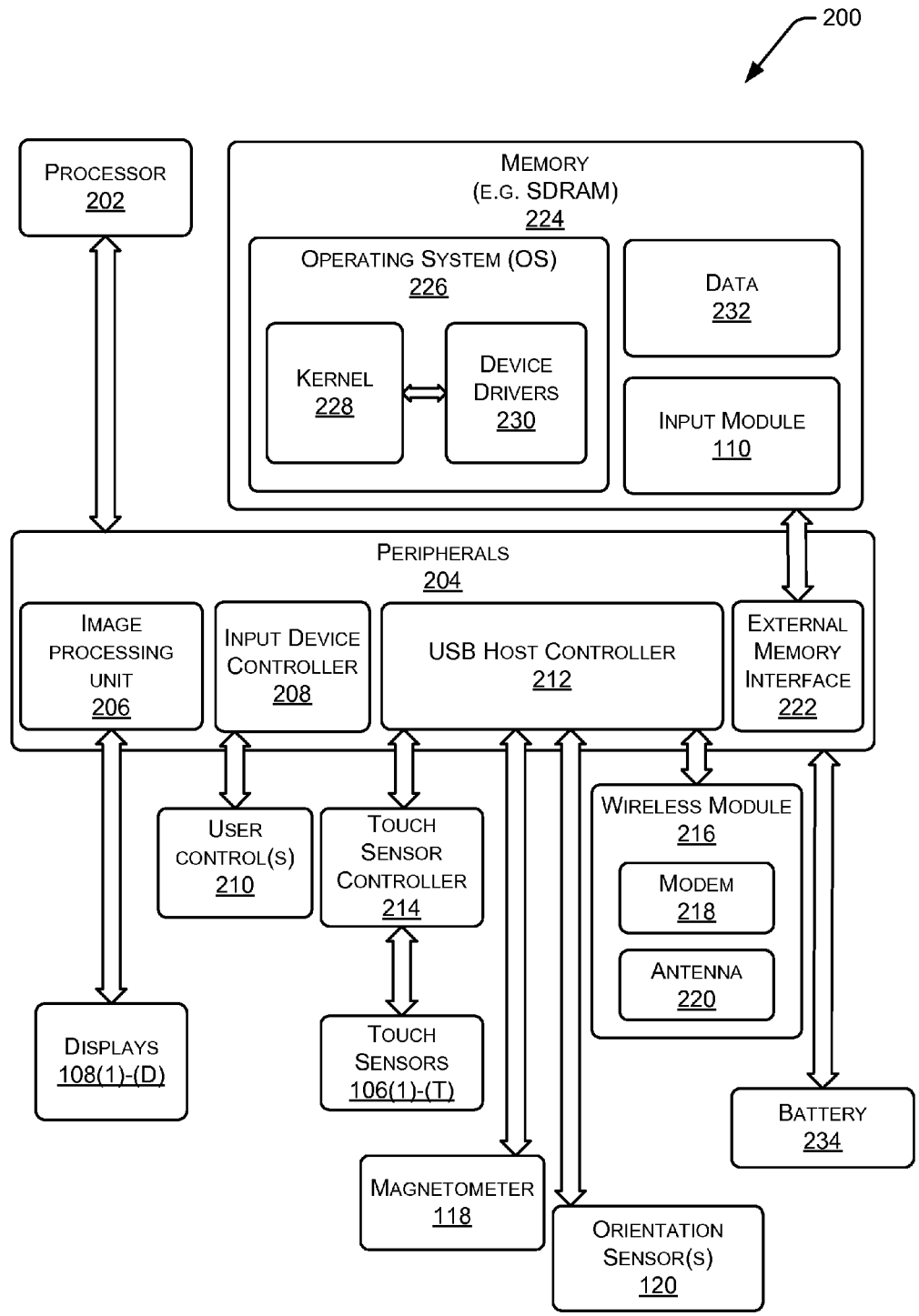
FIG. 2 is an illustrative schematic of the electronic device with a two-sided touch sensor.

FIG. 2 is an illustrative schematic 200 of the electronic device 100 of FIG. 1. In a very basic configuration, the device 100 includes components such as a processor 202 and one or more peripherals 204. Each processor 202 may itself comprise one or more processors.

Peripherals 204 couple to the processor 202. An image processing unit 206 is shown coupled to one or more display components 108(1)-(D) (or "displays"). In some implementations, multiple displays may be present and coupled to the image processing unit 206. These multiple displays may be located in the same or different enclosures or panels. Furthermore, one or more image processing units 206 may couple to the multiple displays.

The display 108 may present content in a human-readable format to a user. The display 108 may be reflective, emissive, or a combination of both. Reflective displays utilize incident light and include electrophoretic displays, interferometric modulator displays, cholesteric displays, pre-printed materials, and so forth. Emissive displays do not rely on incident light and, instead, emit light. Emissive displays include backlit liquid crystal displays, time multiplexed optical shutter displays, light emitting diode displays, backlit pre-printed materials, and so forth. When multiple displays are present, these displays may be of the same or different types. For example, one display may be an electrophoretic display while another may be a liquid crystal display. In another example, one display may be electrophoretic and configured to present black and white images, while another display may be electrophoretic and configured to present color images.

For convenience only, the display 108 is shown in a generally rectangular configuration. However, it is understood that the display 108 may be implemented in any shape, and may have any ratio of height to width. Also, for stylistic or design purposes, the display 108 may be curved or otherwise non-linearly shaped. Furthermore the display 108 may be flexible and configured to fold or roll.

The content presented on the display 108 may take the form of electronic books or "eBooks." For example, the display 108 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The device 100 may have an input device controller 208 configured to accept input from a keypad, keyboard, or other user actuable controls 210. These user actuable controls 210 may have dedicated or assigned operations. For instance, the actuatable controls may include page turning buttons, a navigational keys, a power on/off button, selection keys, joystick, touchpad, and so on.

The device 100 may also include a USB host controller 212. The USB host controller 212 manages communications between devices attached to a universal serial bus ("USB") and the processor 202 and other peripherals.

FIG. 2 further illustrates that the device 100 includes a touch sensor controller 214. The touch sensor controller 214 couples to the processor 202 via the USB host controller 212 (as shown). In other implementations, the touch sensor controller 214 may couple to the processor via the input device controller 208, inter-integrated circuit ("I²C"), universal asynchronous receiver/transmitter ("UART"), or serial peripheral interface bus ("SPI"), or other interfaces. The touch sensor controller 214 couples to one or more of the touch sensors 106(1)-(T).

The touch sensor 106 may comprise various technologies including interpolating force-sensing resistance (IFSR) sensors, capacitive, magnetic, force sensitive resistors, acoustic, optical, and so forth. The touch sensor 106 may be configured such that user input through contact or gesturing relative to the device 100 may be received.

The touch sensor controller 214 is configured to determine characteristics of interaction with the touch sensor 106. These characteristics may include the location of the touch on the touch sensor 106, magnitude of the force, shape of the touch, and so forth.

The magnetometer 118 may also be coupled to the USB host controller 212, or another interface. The magnetometer characterizes impinging magnetic fields. Characterization may include determining a magnetic field strength, magnetic field polarity, angular bearing to a magnetic field, and so forth. When combined with a magnetic implement such as a magnetic ring or stylus, the input module 110 may determine the originating side of a touch.

Also coupled to the USB host controller 212 or another interface are one or more orientation sensors 120. These orientation sensors may include a proximity sensor, an ambient light sensor, a camera, a gravimeter, an accelerometer, position sensors, and so forth. The orientation sensors 120 provide environmental awareness to the device 100, which may be used by the input module 110 to determine the relative orientation of the device 100 with the user. Once the relative orientation of the device to the user is determined, the input module 110 may determine which side of the device a touch input originated from and associate the touch input with the touch controls associated with the originating side.

The USB host controller 212 may also couple to a wireless module 216 via the universal serial bus. The wireless module 216 may allow for connection to wireless local or wireless wide area networks ("WWAN"). Wireless module 216 may include a modem 218 configured to send and receive data wirelessly and one or more antennas 220 suitable for propagating a wireless signal. In other implementations, the device 100 may include a wired network interface.

The device 100 may also include an external memory interface ("EMI") 222 coupled to external memory 224. The EMI 222 manages access to data stored in external memory 224. The external memory 224 may comprise Static Random Access Memory ("SRAM"), Pseudostatic Random Access Memory ("PSRAM"), Synchronous Dynamic Random Access Memory ("SDRAM"), Dual Data Rate SDRAM ("DDR"), Phase-Change RAM ("PCRAM"), or other computer-readable storage media.

The external memory 224 may store an operating system 226 comprising a kernel 228 operatively coupled to one or more device drivers 230. The device drivers 230 are also operatively coupled to peripherals 204, such as the touch sensor controller 214. The external memory 224 may also store data 232, which may comprise content objects for consumption on eBook reader device 100, executable programs, databases, user settings, configuration files, device status, the input module 110, and so forth.

One or more batteries 234 provide operational electrical power to components of the device 100 for operation when the device is disconnected from an external power supply. The device 100 may also include one or more other, non-illustrated peripherals, such as a hard drive using magnetic, optical, or solid state storage to store information, a firewire bus, a Bluetooth™ wireless network interface, camera, global positioning system, PC Card component, and so forth.

Couplings, such as that between the touch sensor controller 214 and the USB host controller 212, are shown for emphasis. There are couplings between many of the components illustrated in FIG. 2, but graphical arrows are omitted for clarity of illustration.

Touch Sensor Configurations

Several configurations are possible for implementing a two-sided touch sensor 106 depending upon the requirements of the device and characteristics of components such as the touch sensors 106 and the displays 108. By way of illustration, and not as a limitation, the following configurations are discussed.

Figure 3:
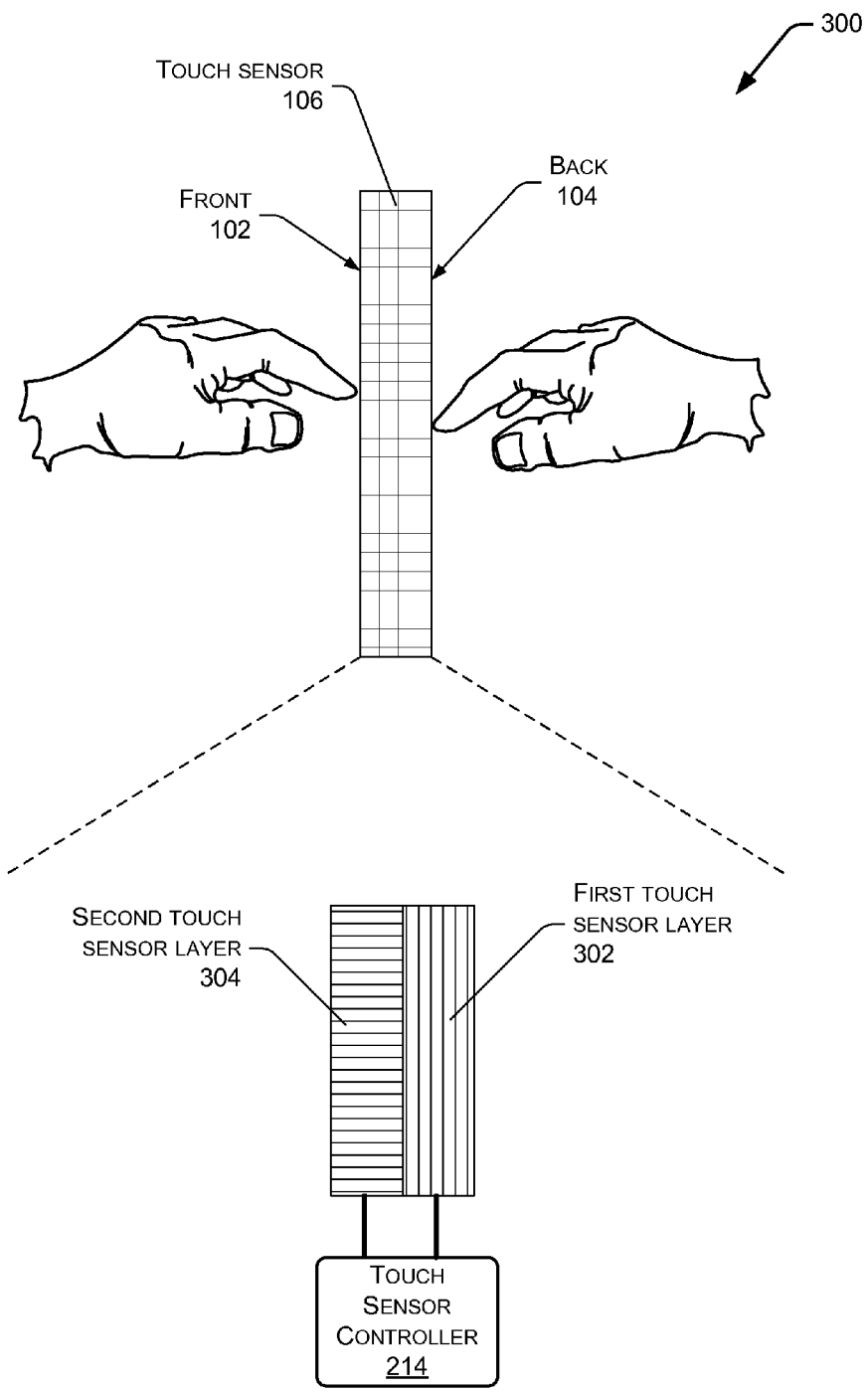
FIG. 3 is a cross-sectional illustration of a two-sided touch sensor.

FIG. 3 is a cross-sectional illustration 300 of a two-sided touch sensor. In this cross section, the two-sided touch sensor 106 is depicted with user touches occurring from both the front 102 and the back 104 of the device 100. The touch-sensor 106 is thus able to discern a touch which is made from either the front 102 or the back 104 of the device, or which results from a pinch where both sides are pressed simultaneously. The touch sensor 106 may be contained within a frame or similar arrangement, which allows for support of the touch sensor 106 while allowing the user to access both touch-sensitive sides.

An enlarged view of the touch sensor 106 shows one configuration, such as with an IFSR sensor. In this illustration, a first touch sensor layer 302 is shown adjacent to a second touch sensor layer 304. For example, in one implementation of the IFSR sensor, the first touch sensor layer 302 may comprise an arrangement of parallel conductors aligned in one direction, while the second touch sensor layer 304 comprises an arrangement of parallel conductors aligned perpendicular to the conductors of the first touch sensor layer 302. The layers couple to the touch sensor controller 214 for readout and determination of touch input. In other implementations and in other sensor types, the touch sensor 106 may comprise one or more layers.

Figure 4:
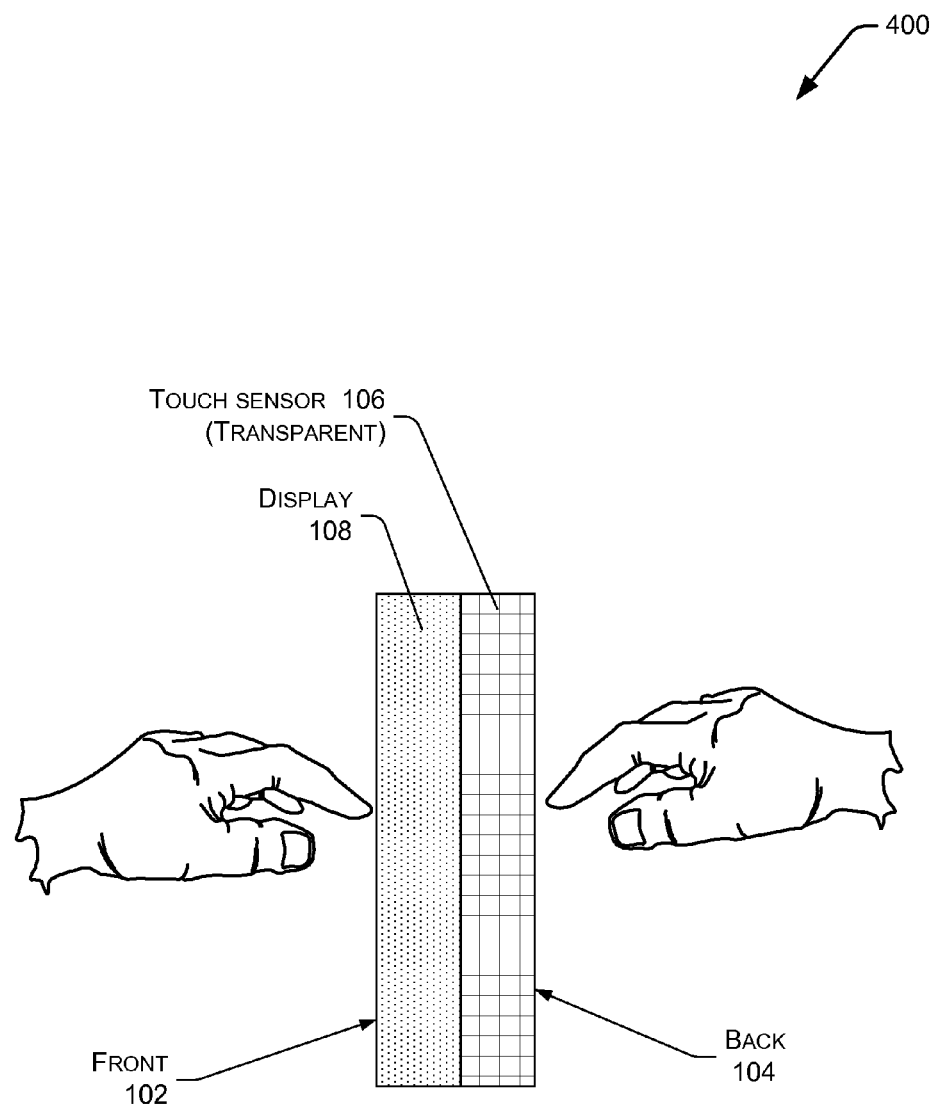
FIG. 4 is a cross-sectional illustration of a two-sided touch sensor with an adjacent display.

FIG. 4 is a cross-sectional illustration 400 of a two-sided touch sensor with an adjacent display. In this illustration, the touch sensor 106 is disposed adjacent to and coincident with the display 108. In one implementation the touch sensor 106 may be configured such that an image presented on the display 108 is visible through at least a portion of the touch sensor 106. For example, a user may be able to view the image on the display 108 directly from the front 102, or through the touch sensor 106 from the back 104. When operating in this implementation, the input module 110 may coordinate with the image processing unit 206 to adjust presentation of content on the display. For example, based upon the orientation of the user relative to the device, a screen of content such as an eBook may be presented when the front 102 side is facing the user, while a screen presenting controls is presented when the back 104 side is facing to the user.

In another implementation, the touch sensor 106 may be opaque, and the image visible only from the front 102. Regardless of the opacity of the touch sensor 106, the touch sensor 106 accepts touch input from the front 102 as transmitted through the display 108, or from the back 104 as directly impinged upon the touch sensor 106.

Figure 5:
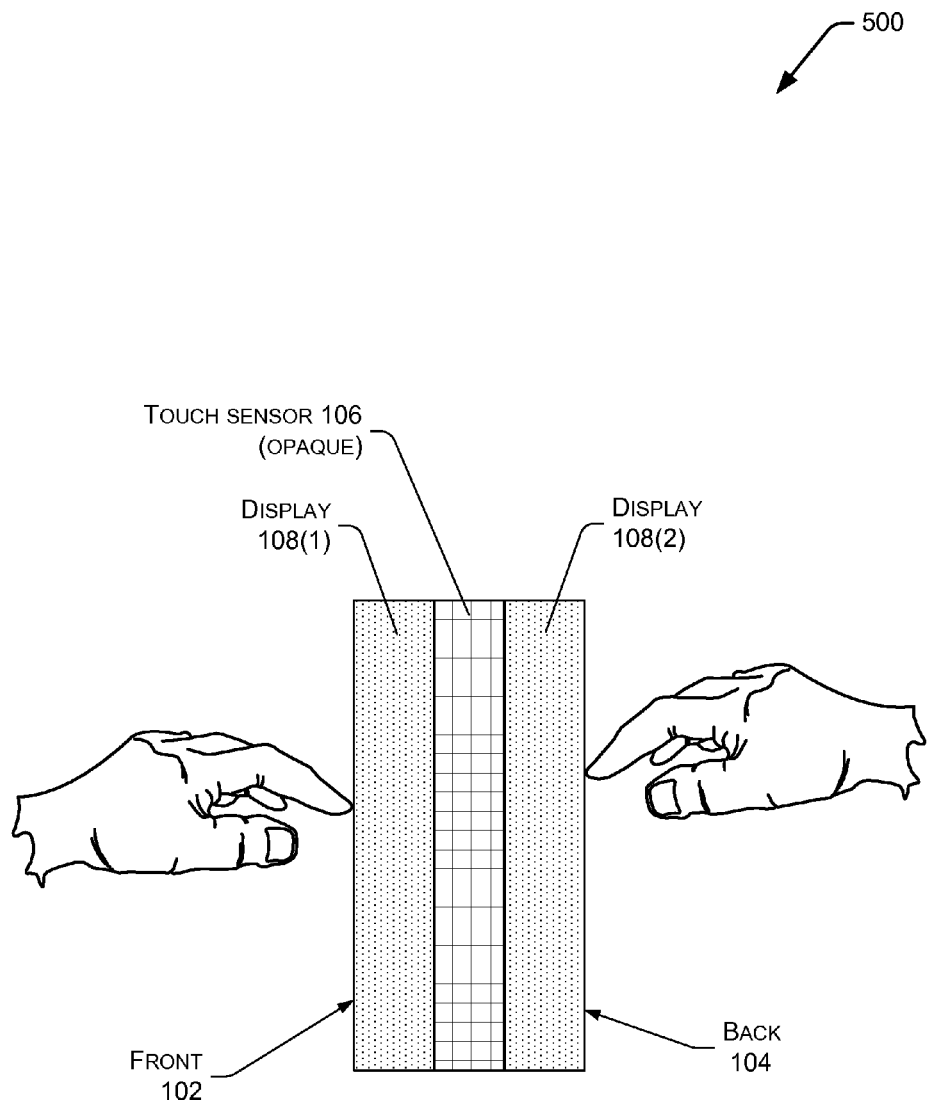
FIG. 5 is a cross-sectional illustration of a two-sided touch sensor with a display on each of the two sides.

FIG. 5 is a cross-sectional illustration 500 of a two-sided touch sensor 106 with a display on each of the sides. The touch sensor 106, which may be opaque in some implementations, is disposed between the first display 108(1) and the second display 108(2). Each of these displays 108 are configured to present images to the user, and transmit incident touches through to the underlying touch sensor 106. As described above, these two displays may be of different types. For example, the first display 108(1) may comprise an electrophoretic display while the second display 108(2) comprises a liquid crystal display.

By disambiguating the originating side of a touch, the device 100 may present different content and touch controls on opposite sides of the device simultaneously. When a touch is received by the two-sided touch sensor 106, the disambiguation allows for the device 100 to respond as intended by the user. As mentioned above, and described below in more detail with regards to FIGS. 8-15, analysis of touches and input from magnetometers, orientation sensors, position sensors, and so forth allow for determination of the originating side of the touch.

Figure 6:
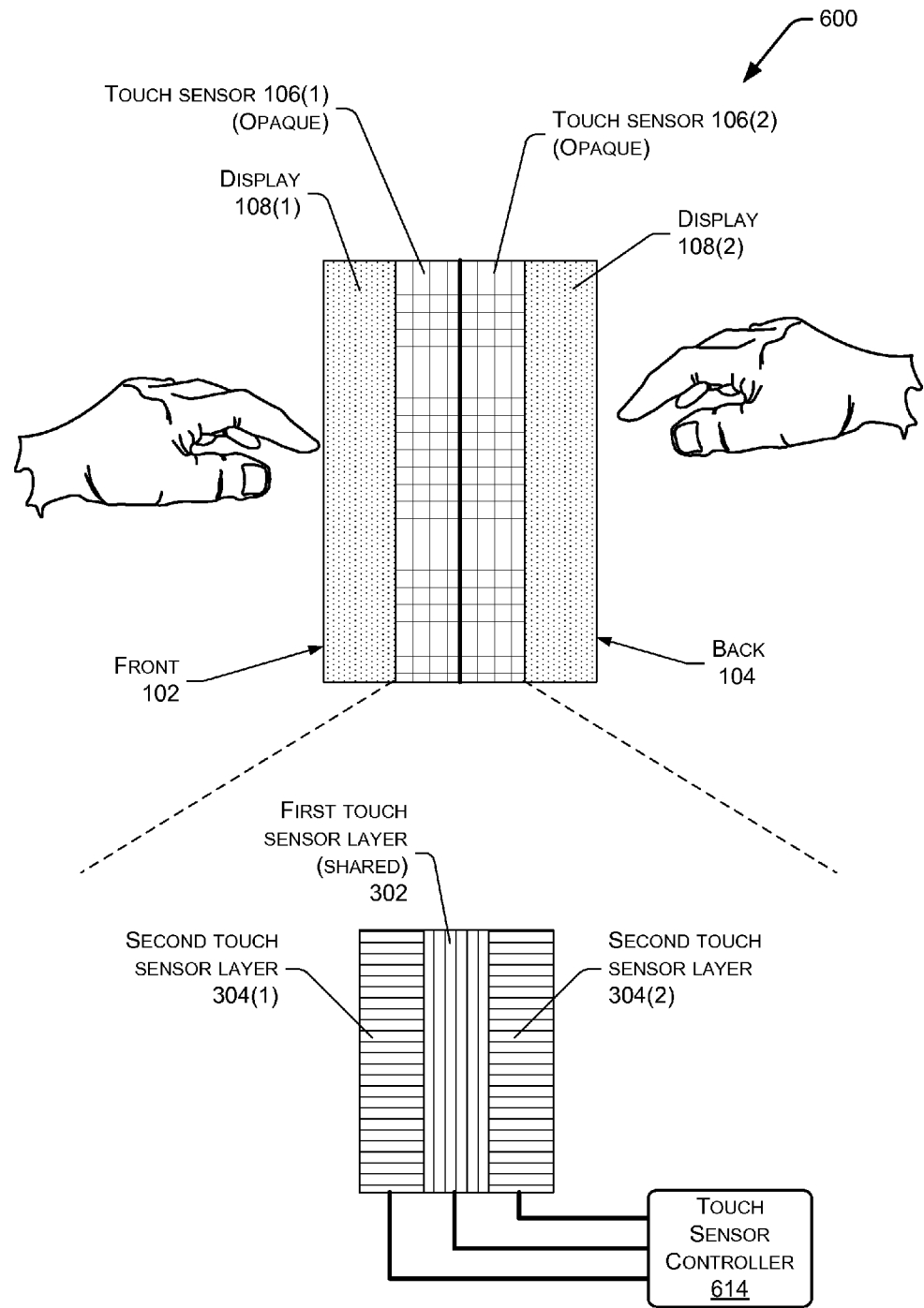
FIG. 6 is a cross-sectional illustration of a two touch sensors where each of the touch sensors is paired with a display.

FIG. 6 is a cross-sectional illustration 600 of a two opposing touch sensors where each of the touch sensors is paired with a display. As shown here, in some implementations a display 108(1) and adjacent and coincident touch sensor 106(1) may be placed adjacent to and coincident with another touch sensor 106(2) and display 108(2). Such an implementation may be desirable when the combination of touch sensor 106 and display 108 provides a common assembly. By placing two such common assemblies back to back, the number of specialized components necessary for fabrication are reduced, potentially reducing production costs.

In another implementation, the touch sensors 106(1)-(2) may share one or more common components. As illustrated in an enlargement within this figure, a first touch sensor layer 302 is disposed between second touch sensor layers 304(1) and 304(2). In this arrangement, the first touch sensor layer 302 is shared between the two touch sensors. During operation, readings from the shared first touch sensor layer 302 is used by the touch sensor controller in conjunction with readings from one or both of the second touch sensor layers 304(1)-(2) to render touch output. Sharing common components may provide several benefits such as providing a lower profile for the touch sensor 106, reducing overall parts count, and so forth. In some implementations, the shared first touch sensor layer 302 may incorporate other components such as the processor 202, peripherals 204, memory 224, and so forth.

To minimize or eliminate the ambiguity of the originating side of a touch, the shared first touch sensor layer 302 may comprise a rigid structure. This rigid structure may be configured to disperse incident forces and minimize bleed-through of a touch from the touch sensor 106(1) on the front 102 to the touch sensor 106(2) on the back 104, and vice versa. While sharing components, the touch sensors 106(1) and 106(2) are each independently addressable. Additionally, the originating side of a touch is readily determined in this implementation.

Originating Side Disambiguation

Figure 7:
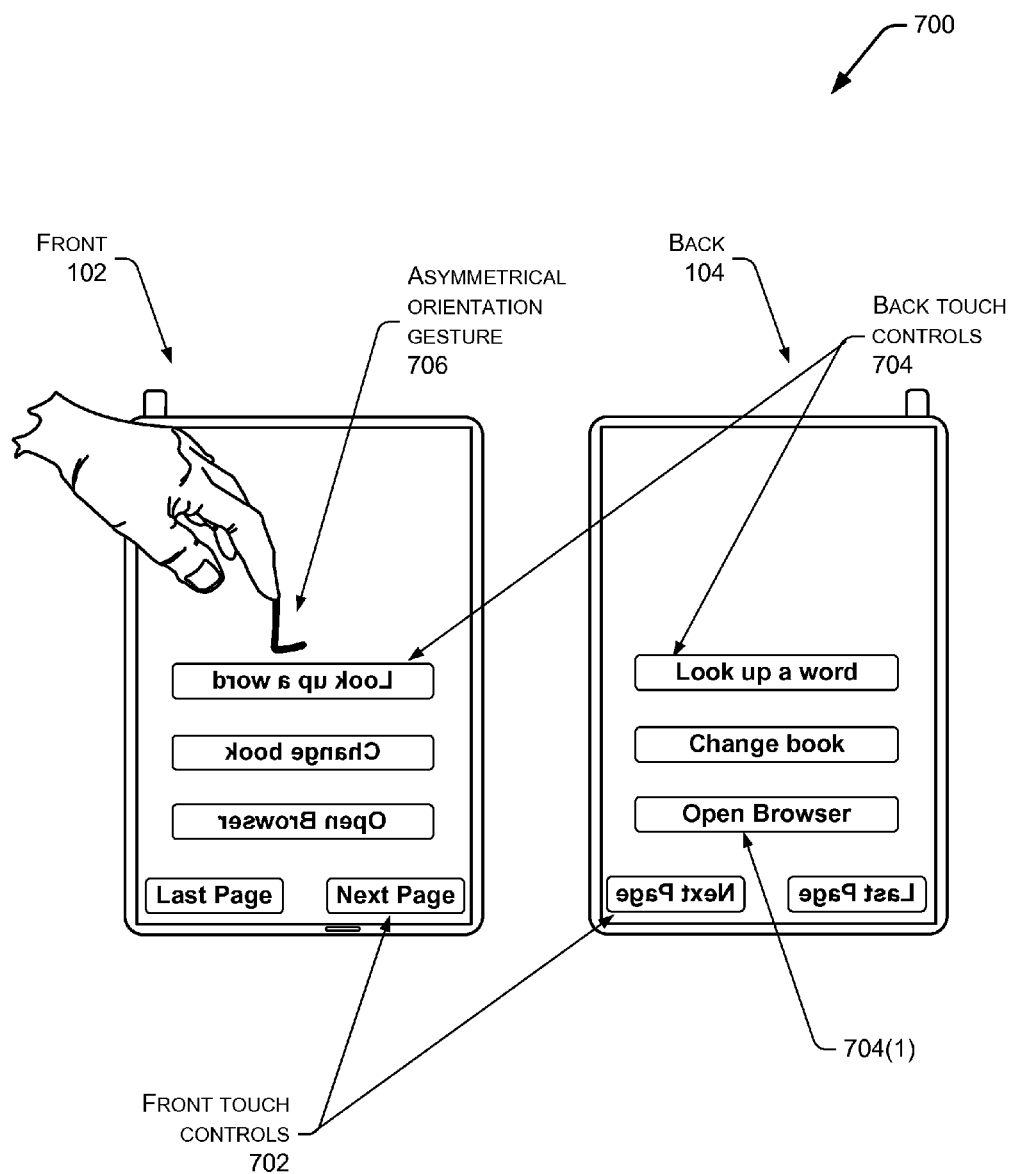
FIG. 7 illustrates a front and back of the device with touch controls associated with each of the respective sides arranged such that they are free from overlapping.

FIG. 7 illustrates a front and back of the same device 700 with touch controls associated with each of the respective sides. The touch controls are arranged so as not to overlap one another. These touch controls are virtual in that they exist as designated areas within the touch sensor 106. Any active portion of the touch sensor 106 may be designated as a touch control. In some implementations, touch controls may be distributed such that ambiguity as to the originating side of a touch is irrelevant. In this illustration, a set of front controls 702 intended for use while the front 102 of the device is facing the user are shown, along with a set of back touch controls 704 similarly intended for use while the back 104 of the device is facing the user.

Input may be accepted from both sides and without ambiguity because areas associated with each of the touch controls do not overlap. For example, the control 704(1) to "open browser" does not overlap any other control. Thus, a touch to the area assigned to this control is interpreted as a touch for the "open browser" control 704(1), regardless of which side the contact occurred. While the originating side of the touch may be ambiguous, this ambiguity does not affect operation or interpretation of which touch control was selected.

Orientation of the user relative to the device may also be determined by analyzing pressure applied to the two-sided touch sensor by the user's hands. Given the known configuration and biomechanical properties of the human hand, it is possible to determine an orientation of the hands, and thus the user's body, based in part upon their touches to the touch sensor.

In another implementation, the user may enter a pre-determined asymmetrical gesture 706 on the touch sensor which allows for disambiguation as to the orientation. The asymmetrical gesture is such it remains recognizable as having a defined orientation even when rotated. The asymmetrical gesture may be non-linguistic, such as a contrived figure, or may be a letter or pictograph. For example, as shown here the asymmetrical gesture comprises entry of an English capital letter "L." The letter "L" is asymmetrical about both its vertical axis as well as its horizontal axis, allowing distinction as to orientation. In contrast, a letter such as "O" exhibits symmetry about both axes. The input module 110 may be configured to detect touch inputs and ascertain when the pre-determined asymmetrical gesture 706 is input, and determine orientation of the user accordingly.

Figure 8:
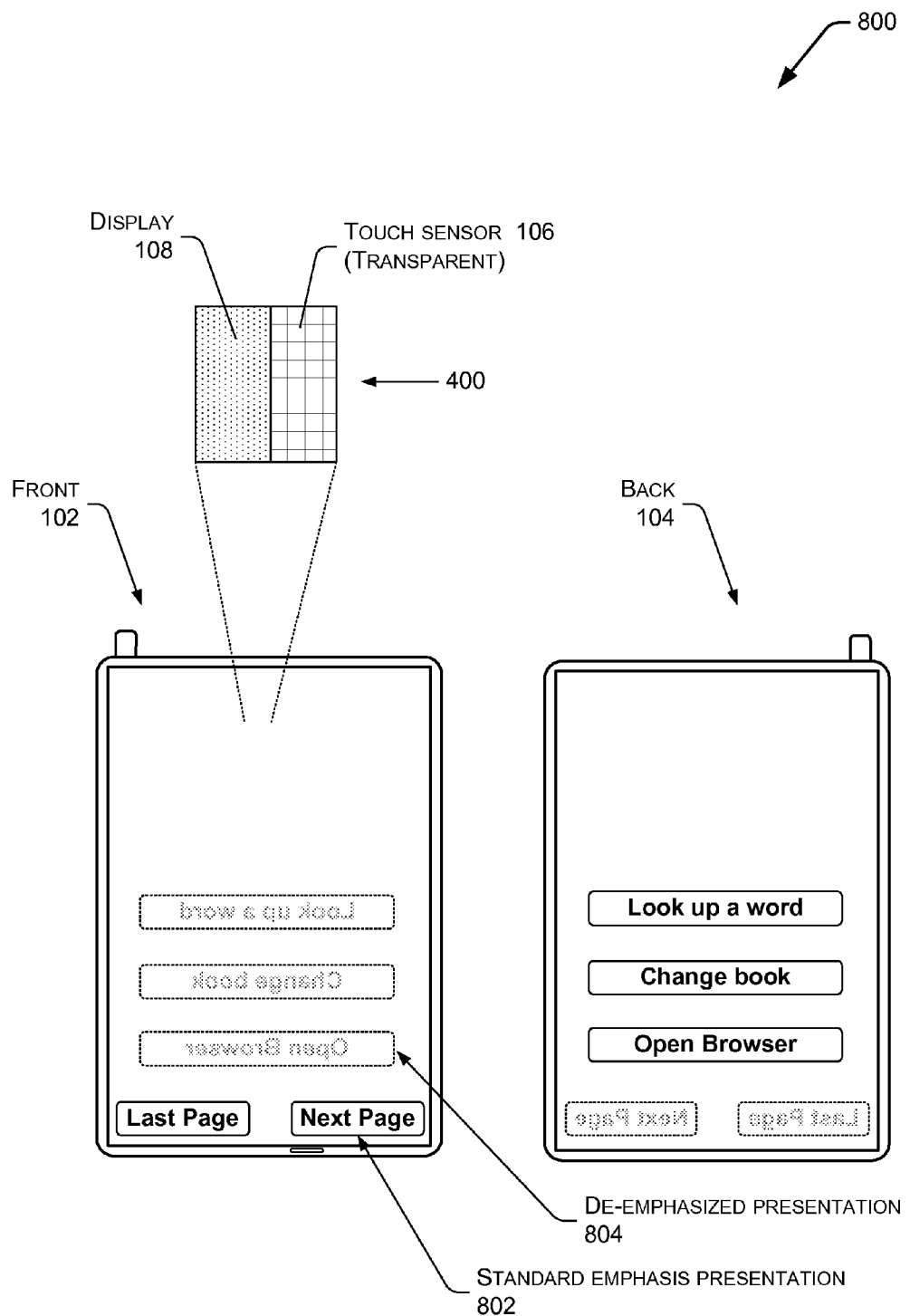
FIG. 8 illustrates a front and back of the device with two-sided touch sensors and a shared display, where the image associated with the side opposite a user is de-emphasized or removed from the display.

FIG. 8 illustrates a front and back of the device with two-sided touch sensors and a shared display 800, where the image associated with the side opposite a user is de-emphasized or removed from the display. In this illustration, a single display 108 is visible from both the front 102 and the back 104, as described above with regards to FIG. 4.

The device 100 may operate the single display 108 in one of several display modes which provide varying emphasis to account for the visibility of a presented image from both sides at the same time. In a first mode, the user may see images from both sides of the display 108 at the same time with the same standard emphasis 802. For example, as shown above in FIG. 7, the images of the controls of both sides are visible. However, this may be confusing or distracting to a user.

To reduce or eliminate the confusion, in a second mode such as pictured here the image on the screen facing towards the user is presented at standard emphasis 802, while the image on the screen facing away from the user is shown with a de-emphasized presentation 804. This de-emphasized presentation 804 may include graying out the image, reducing an intensity, and so forth. By de-emphasizing presentation 804 of an image associated with the opposing side, the user is provided with a visible cue that the de-emphasized image is associated with the side of the device facing away from them.

In a third mode, the image on the screen facing towards the user is presented at standard emphasis 802 while no image associated with the opposing side is presented. For example, the image associated with the side of the device facing away is completely suppressed. As a result, the user only sees the image presented associated with the side facing them.

Because the display 108 is two-sided such that an image is visible from two opposing sides, the display 108 does not actually render two separate images, but rather a single image viewable from both sides. In response to a determination of orientation relative to the user, the image processing unit 206 may be configured to de-emphasize or suppress display of output associated the side of the device facing away from the user, as described above.

Figure 9:
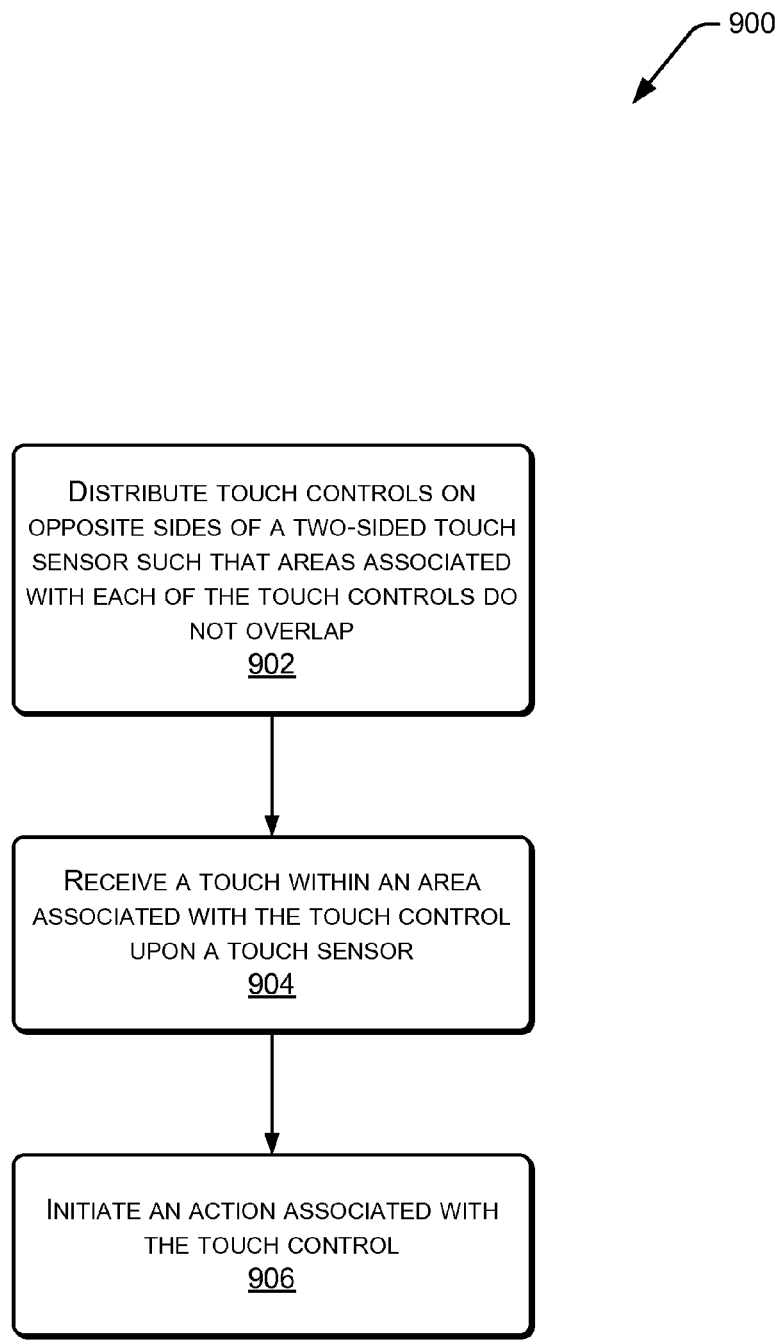
FIG. 9 is an illustrative process of accepting touch input from a two-sided touch sensor where the opposing touch controls are free from overlap.

FIG. 9 is an illustrative process 900 of accepting touch input from a two-sided touch sensor where the opposing touch controls are free from overlap. This process, and others described in this disclosure may be implemented by the architectures described in this disclosure, or by other architectures. These processes described in this disclosure are illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

At 902, touch controls are distributed on opposite sides of a two-sided touch sensor such that areas associated with each of the touch controls do not overlap. Because the areas are free from intrusion upon one another, it becomes unnecessary to determine an originating side for a touch which selects the touch control.

At 904, the touch sensor 106 receives a touch within one of the areas. At 906, the input module 110 initiates an action associated with the touch control corresponding to the area. For example, the user may select the "next page" touch control, in response the device 100 updates the display 108 to present the next page of the eBook.

As described above, in some situations the originating side of a touch is not relevant because touch controls on opposing sides of the touch sensor do not overlap. However, in some situations the density of touch control surfaces or user interface requirements may call for touch controls to overlap. As a result, active disambiguation is called for, as described next.

Figure 10:
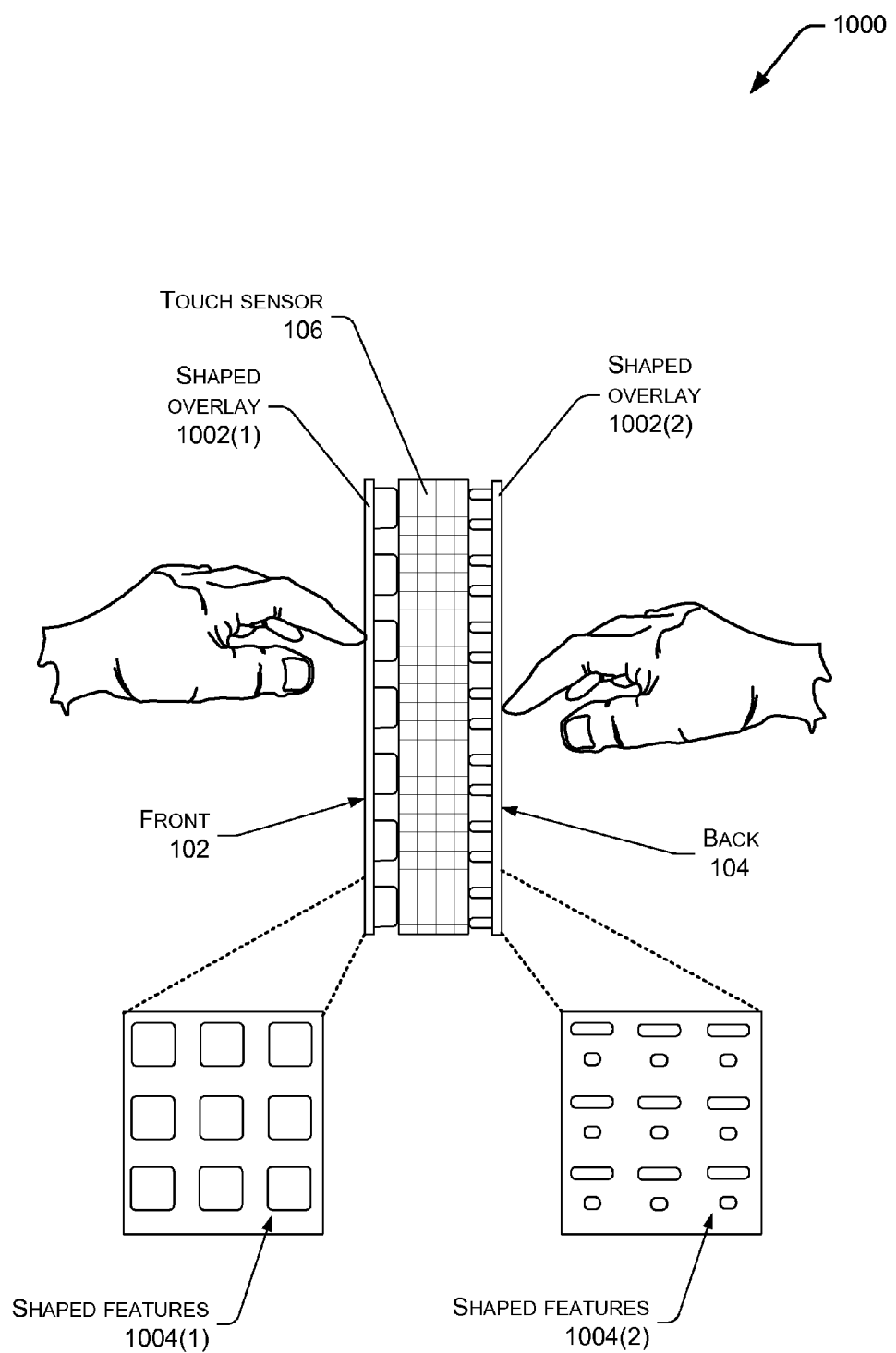
FIG. 10 is a cross-sectional illustration of a two-sided touch sensor with shaped overlays to disambiguate an originating side of a touch.

FIG. 10 is a cross-sectional illustration 1000 of a two-sided touch sensor with shaped overlays to distinguish an originating side of a touch. As shown here, a two-sided touch sensor 106 has a shaped overlay 1002(1) disposed adjacent to and coincident with the front 102 side of the touch sensor 106. The shaped overlay 1002(1) comprises a resilient material having a plurality of shaped features 1004(1) on at least one side. In some implementations, the shaped overlay 1002(1) may act as a protective sheet, eliminating the need for a separate protective sheet.

The shaped overlay 1002(1) is disposed adjacent to and coincident with one side of the touch sensor 106 and configured such that an incident touch upon the shaped overlay 1002(1) will push one or more of the shaped features 1004(1) into the touch sensor 106. As a result, the touch sensor 106 will generate a touch output indicating the distinctive shape. The input module 110 in turn assesses the distinctive shape and determines the originating side.

In the implementation shown in this figure, a second shaped overlay 1002(2) has a different pattern of shaped features 1004(2) and is shown adjacent to and coincident with the back 104 of the touch sensor 106. Thus, a press on the front 102 would result in the shaped overlay 1002(1) pressing a pattern of one or more small squares into the touch sensor 106, while a press on the back 104 would result in the shaped overlay 1002(2) pressing a pattern of one or more small combinations of a bump and a ridge. The shaped features 1004 may comprise other geometries such as polygons, circles, ridges, and so forth. The input module 110 is configured to associate the shapes with a particular originating side or area on the touch sensor.

In another implementation, the touch sensor 106 may have a shaped overlay 1002(1) on a first side, and no shaped overlay on the second side. Touches having characteristics resembling the shaped features may thus be determined to originate from the first side with the shaped overlay 1002, while other touches originate from the second side.

Figure 11:
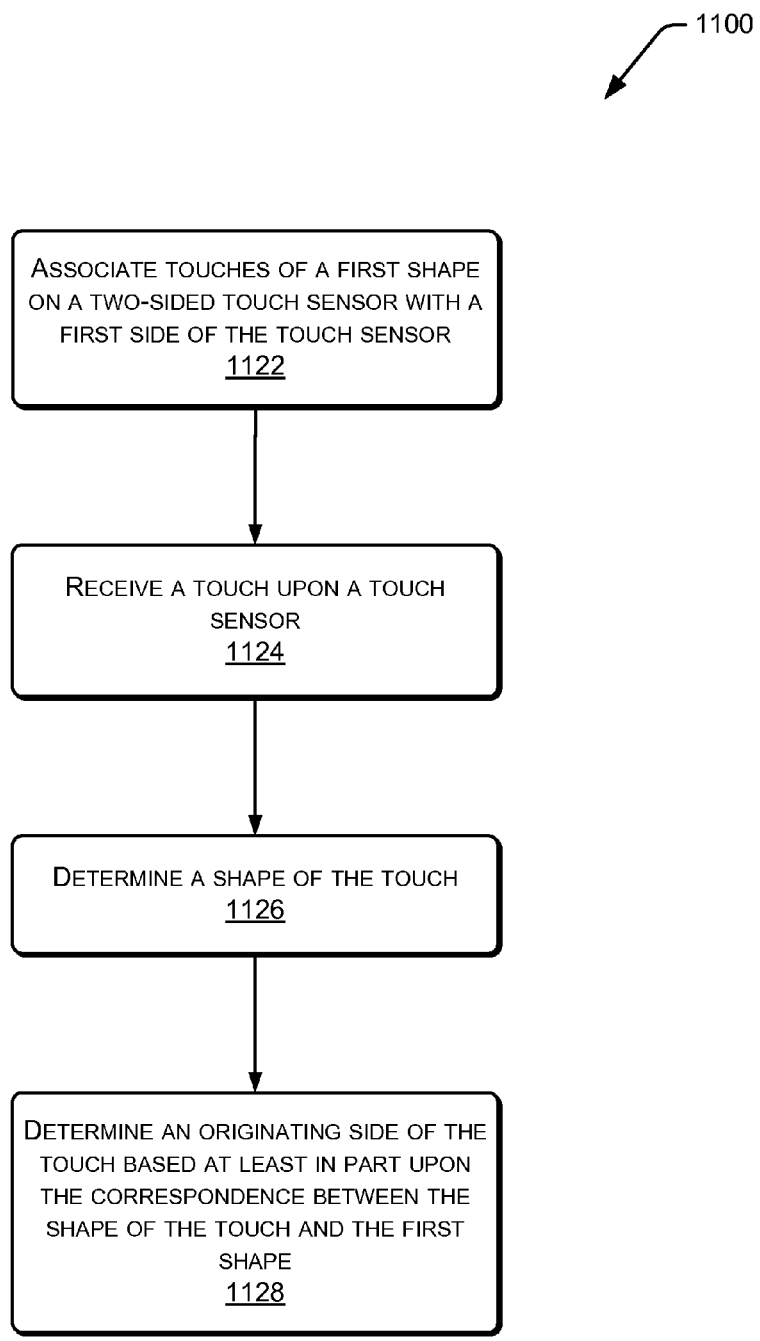
FIG. 11 is an illustrative process of disambiguate an originating side of a touch based at least in part upon shaped features of a shaped overlay.

FIG. 11 is an illustrative process 1100 of distinguishing an originating side of a touch based at least in part upon shaped features of a shaped overlay 1002. At 1102, touches of a first shape are associated with a first side of the two-sided touch sensor 106. For example, as described above, small squares may be associated with the front 102 of the device.

At 1104, a touch sensor 106 receives a touch. The touch may be a user finger, stylus, or some other pointing instrument. At 1106, an input module 110 determines a shape of the touch. For example, the input module 110 may determine that the touch comprises small square shapes.

At 1108, the input module 110 determines an originating side of the touch, based at least in part upon correspondence between the shape of the touch and the first shape. For example, given the shape of the touch comprises small squares, the input module 110 determines the originating side of the touch as being the front 102.

Figure 12:
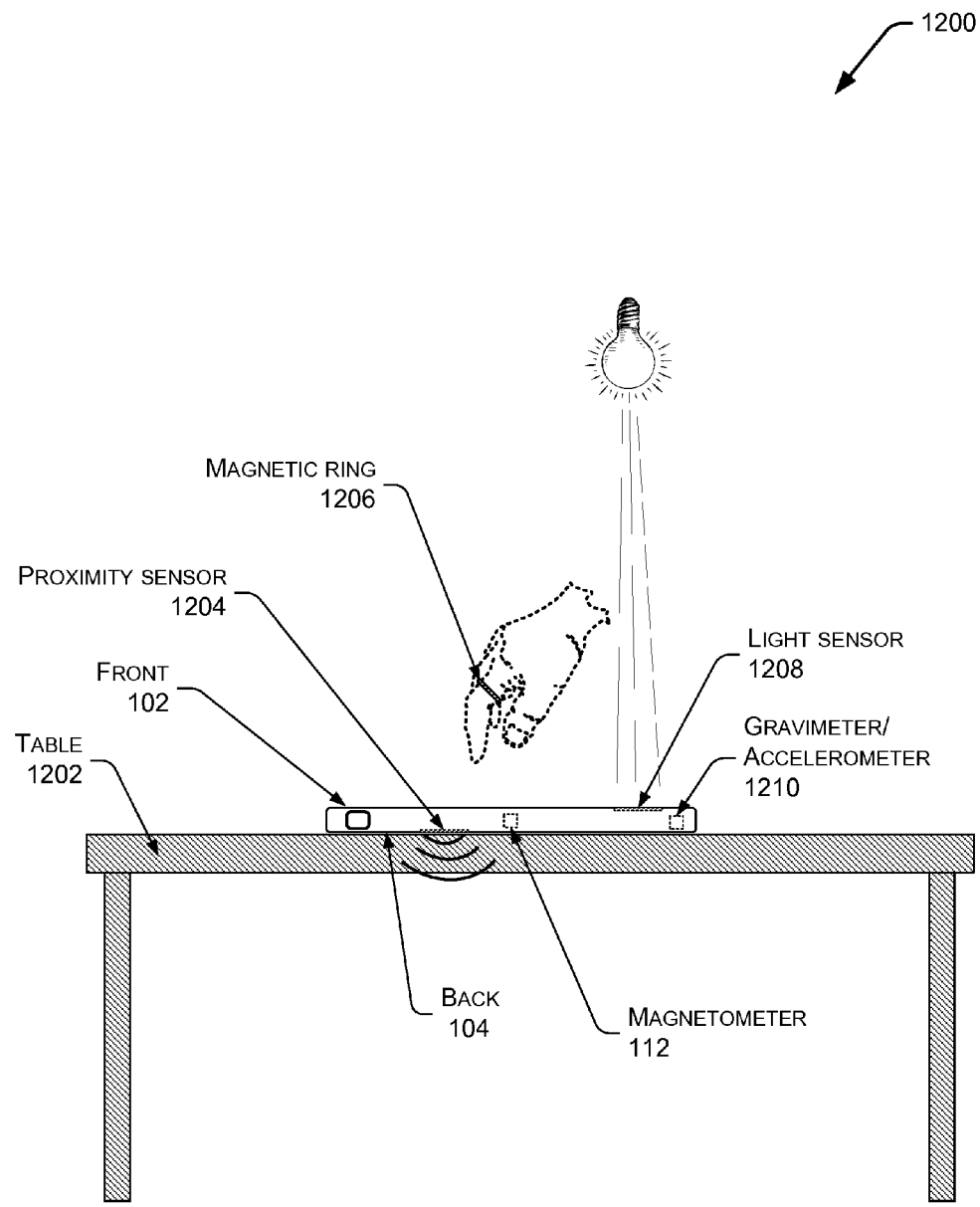
FIG. 12 illustrates various sensors usable in determining an orientation of the device to determine which side is proximate to the user.

FIG. 12 illustrates various sensors 1200 usable in determining an orientation of the device to determine which side is proximate to the user. As described above, where touches may be input on either side of a two-sided touch sensor 106, it is necessary to disambiguate which side a touch is intended for when the areas of touch controls overlap between the two sides. Otherwise, the user may inadvertently activate touch controls associated with the side of the device opposite them during use.

In this illustration, the electronic device 100 is shown sitting upon a table 1202. The front 102 of the device is facing upwards, and the back 104 is facing downwards, resting on the table. A proximity sensor 1204 is depicted, which is able to determine when another object is adjacent. The proximity sensor 1204 may be capacitive, optical, mechanical, acoustic, and so forth in nature. As shown here, the proximity sensor 1204 has determined the back 104 is close to a surface, and thus the input module 110 may assume that the front 102 is proximate to the user and thus touches on the touch sensor 106 are deemed to originate from this side.

The magnetometer 112 may be used to determine relative orientation between the user and the device 100. Where the user has a magnetic implement such as a magnetic ring, magnetic stylus, and so forth, the presence and relative position of the magnet may be used to disambiguate the originating side of the touch. For example, as shown here the user is wearing a magnetic ring 1206 on a finger. The magnetometer 112 senses the magnetic field emanating from the ring 1206 and determines that the ring 1206 is located towards the front 102 of the device 100. Using this data, the input module 110 may presume that touches are on the same side as the ring 1206.

Other sensors may be used to determine relative orientation of the device 100 to the user. A light sensor 1208, may be used to sample ambient light and determine orientation. For example, as shown here the light sensor 1208 is located on the front 102 of the device 100. The light sensor 1208 reports to the input module 110 that ambient light received at the sensor is at a level above a pre-determined threshold. The input module 110 may thus assume that the front 102 of the device is facing the user. In some implementations a camera may be used in a similar fashion.

Other orientation sensors 120, such as a gravimeter or accelerometer 1210, may also determine orientation to the user. For example, the gravimeter is sensitive to gravity fields, and indicates which direction is down. This data may be used by the input module 110 to orient the device based on the assumption that a user will generally be above the device and not below. Thus, if the back 104 of the device is down, the front 102 is assumed to proximate to the user. In other implementations, motions of the device as determined by the accelerometer may be used to determine the relative orientation.

Figure 13:
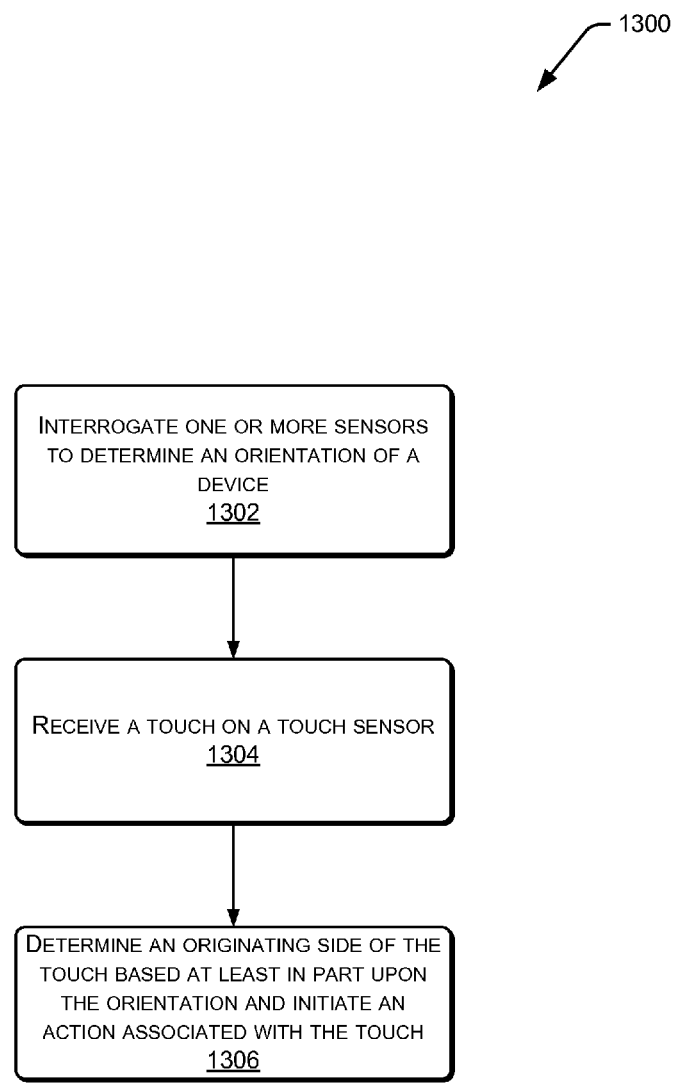
FIG. 13 is an illustrative process of determining which side of the device is proximate to the user.

FIG. 13 is an illustrative process 1300 of determining which side of the device is proximate to the user. At 1302, one or more sensors are interrogated to determine an orientation of a component of the device 100, such as moveable pages within an eBook device. For example, data from the proximity sensor 1204 and the light sensor 1208 may be used by the input module 110 to determine which side of the device is proximate to the user.

At 1304, a touch sensor 106 receives a touch. This touch may be made by a human finger, stylus, or other contacting element. At 1306, the input module 110 determines the originating side of the touch based at least in part upon the orientation, and initiates an action associated with the touch. For example, the proximity sensor may indicate that the front 102 is closest to the user, and thus a touch control associated with a particular area presented on the front touch sensor 106(1) is activated, rather than an overlapping touch control associated with the back 104 of the device.

Figure 14:
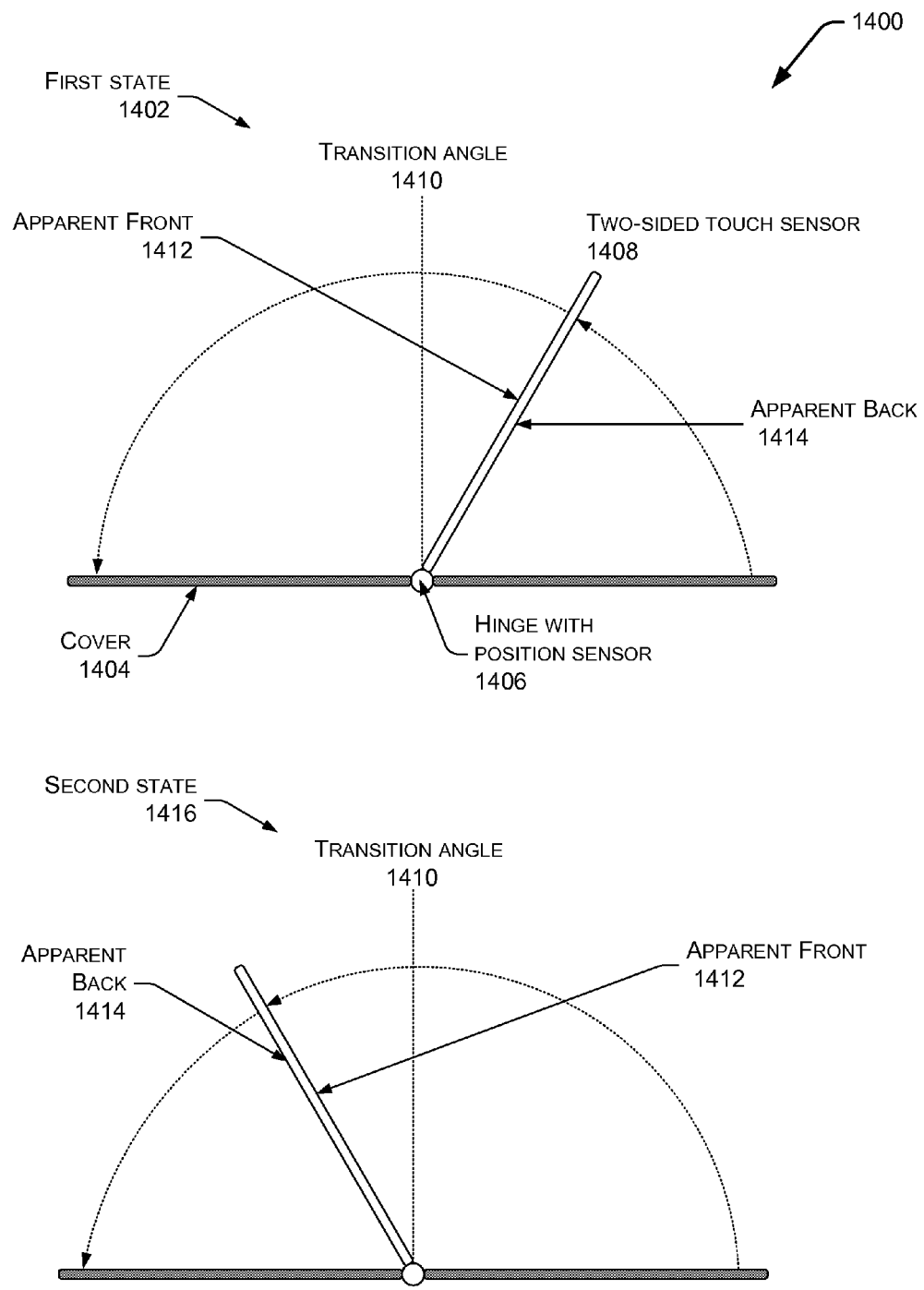
FIG. 14 illustrates a position sensor usable in determining an orientation of a portion of the device relative to another portion of the device to determine which side is proximate to the user.

FIG. 14 illustrates a device 1400 with a position sensor usable in determining an orientation of which portion of the device is proximate to the user. For example, consider the device is an eBook reader device which has moveable pages. As the user flips the moveable pages, the portion of the moveable page which is proximate to the user changes.

As shown in a first state 1402, the device 1400 comprises a cover 1404. The cover is joined in the middle by a hinge with a position sensor 1406. Also joined to the hinge with the position sensor 1406 is a two-sided touch sensor 1408. A transition angle 1410 is indicated as a broken line extending from the hinge 1406 and perpendicular to the cover 1404. The hinge with the position sensor 1406 provides output to the input module 110 which is used to determine which side of the two-sided touch sensor is considered the front, and which the back. When the two-sided touch sensor 1408 moves past the transition angle 1410, the input module reconfigures the apparent front 1412 and apparent back 1414 of the two-sided touch sensor 1408. Continuing the example, as the user flips the moveable pages, the apparent front side changes as a result of the movement of the page.

Generally, the side of the two-sided touch sensor which is proximate to the transition angle 1410 line is considered the apparent front 1412, while the side closest to one of the covers is considered the apparent back. A second state 1416 shows the transition where the two-sided touch sensor 1408 has moved from right to left, such as with a turning page, and progressed past the transition angle 1410. As a result, the apparent front 1412 and apparent back 1414 have been swapped as shown.

Figure 15:
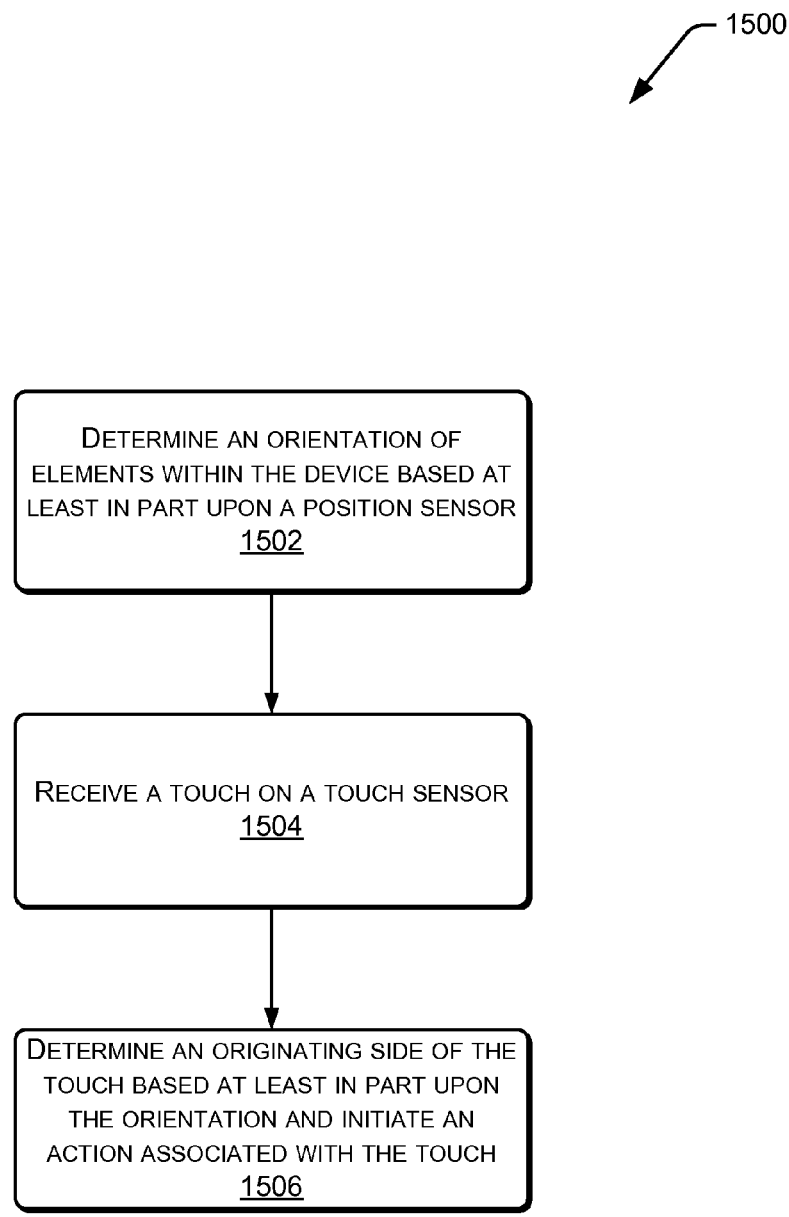
FIG. 15 is an illustrative process of determining which side of the device is proximate to the user.

FIG. 15 is an illustrative process 1500 of determining which side of the device is proximate to the user based upon a position sensor. At 1502, the input module 110 determines an orientation elements within the device based at least in part upon a position sensor. For example, the input module 110 may determine the two-sided touch sensor 1408 is to the right of the transition angle as shown above with regards to FIG. 14 by data from the position sensor.

At 1504, the touch sensor receives a touch. At 1506, the input module 110 determines the originating side of the touch based at least in part upon the orientation, and initiates an action associated with the touch. For example, given the two-sided touch sensor 1408 in the first state, the side proximate to the transition angle is determined to be the front, with the corresponding touch control being activated.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A device comprising:
an interpolating force-sensitive resistor touch sensor having a first side and a second side opposite one another, configured to accept touch input from the first side, the second side, or both, and configured to distinguish between touches from the first side and touches from the second side; and
a display adjacent to and coincident with the first side of the touch sensor and configured to present an image;
wherein:
the interpolating force-sensitive resistor touch sensor includes a plurality of adjacent touch sensor layers;
touches are detected based at least in part on one of a resistance measurement or capacitance measurement between two or more of the adjacent touch sensor layers;
touches from the first side being touches detected based on measurements involving at least a first outermost touch sensor layer of the plurality of adjacent touch sensor layers and one of a second different outermost touch sensor layer of the plurality of adjacent touch sensor layers or a particular different one of the plurality of adjacent touch sensor layers; and
touches from the second side being touches detected based on measurements involving at least the second different outermost touch sensor layer of the plurality of adjacent touch sensor layers and one of the first outermost touch sensor layer of the plurality of adjacent touch sensor layers or the particular different one of the plurality of adjacent touch sensor layers.

2. The device of claim 1, wherein the touch sensor is configured such that the image presented on the display is visible through at least a portion of the touch sensor.

3. The device of claim 2, further comprising an input module configured to determine an orientation with respect to a user and to present the image on the display corresponding to whether the first side or the second side is facing the user.

4. The device of claim 3, wherein the input module configured is further configured to de-emphasize an image associated with a side facing away from the user.

5. The device of claim 1, further comprising a second display adjacent to and coincident with the second side.

6. The device of claim 5, wherein the interpolating force-sensitive resistor touch sensor comprises a shared first touch sensor layer between second touch sensor layers corresponding to each of the displays.

7. The device of claim 1, wherein the touch sensor and the display are flexible.

8. The device of claim 1, wherein the display comprises an electrophoretic display.

9. The device of claim 1, wherein the display comprises a pre-printed image.

10. The device of claim 1, further comprising an input module configured to determine from which side a touch originates.

11. The device of claim 10, further comprising a first shaped overlay comprising a plurality of shapes disposed adjacent to and coincident with the first side of the touch sensor and wherein the input module determines from which side the touch originates based at least in part upon the shape of the touch.

12. A device comprising:
a two-sided touch sensor having a first side and a second side and configured to accept touch input from the first side, the second side, or both, and configured to distinguish touch input from the first side and touch input from the second side; and
a touch sensor controller coupled to the touch sensor and configured to generate touch output;
wherein:
the two-sided touch sensor includes a plurality of adjacent touch sensor layers;
touches are detected based at least in part on one of a resistance measurement or capacitance measurement between two or more of the adjacent touch sensor layers;
touches from the first side being touches detected based on measurements involving at least a first outermost touch sensor layer of the plurality of adjacent touch sensor layers and one of a second different outermost touch sensor layer of the plurality of adjacent touch sensor layers or a particular different one of the plurality of adjacent touch sensor layers; and
touches from the second side being touches detected based on measurements involving at least the second different outermost touch sensor layer of the plurality of adjacent touch sensor layers and one of the first outermost touch sensor layer of the plurality of adjacent touch sensor layers or the particular different one of the plurality of adjacent touch sensor layers.

13. The device of claim 12, wherein the touch sensor comprises an interpolating force-sensitive resistor.

14. The device of claim 12, further comprising a first shaped overlay comprising a plurality of shapes disposed proximate to the first side of the touch sensor and wherein an input module is configured to determine from which side a touch originates based at least in part upon the shape of the touch.

15. The device of claim 12, further comprising an input module configured to determine which side a touch originates from.

16. The device of claim 15, wherein the input module determines which side a touch originates from based at least in part upon a pattern of touches on the touch sensor.

17. The device of claim 15, wherein the input module determines which side a touch originates from based at least in part upon data from one or more sensors.

18. The device of claim 17, wherein one or more sensors comprise a proximity sensor, magnetometer, light sensor, gravimeter, accelerometer, or position sensor.

19. A method comprising:
distributing a plurality of virtual touch controls on opposite sides of a two-sided touch sensor such that areas associated with each of the virtual touch controls are free from overlap;
accepting a touch for an area associated with one of the plurality of virtual touch controls; and
initiating an action associated with the virtual touch control;
wherein:
the two-sided touch sensor includes a plurality of adjacent touch sensor layers; and
touches are detected based at least in part on one of a resistance measurement or capacitance measurement between two or more of the adjacent touch sensor layers;
the method further comprising
detecting touches from a first side based on measurements involving at least a first outermost touch sensor layer of the plurality of adjacent touch sensor layers and one of a second different outermost touch sensor layer of the plurality of adjacent touch sensor layers or a particular different one of the plurality of adjacent touch sensor layers; and
detecting touches from a second side based on measurements involving at least the second different outermost touch sensor layer of the plurality of adjacent touch sensor layers and one of the first outermost touch sensor layer of the plurality of adjacent touch sensor layers or the particular different one of the plurality of adjacent touch sensor layers.

20. The method of claim 19, wherein the virtual touch controls modify presentation of an electronic book on a display.

21. A system comprising:
a two-sided touch sensor configured to accept touch input from either a first side, a second side, or both sides and configured to distinguish touch input from the first side and touch input from the second side, wherein:
the two-sided touch sensor includes a plurality of adjacent touch sensor layers;
touches are detected based at least in part on one of a resistance measurement or capacitance measurement between two or more of the adjacent touch sensor layers;
touches from the first side being touches detected based on measurements involving at least a first outermost touch sensor layer of the plurality of adjacent touch sensor layers and one of a second different outermost touch sensor layer of the plurality of adjacent touch sensor layers or a particular different one of the plurality of adjacent touch sensor layers; and
touches from the second side being touches detected based on measurements involving at least the second different outermost touch sensor layer of the plurality of adjacent touch sensor layers and one of the first outermost touch sensor layer of the plurality of adjacent touch sensor layers or the particular different one of the plurality of adjacent touch sensor layers;
a shaped overlay disposed adjacent to the first side, the shaped overlay comprising an arrangement of shaped features configured to come into contact with the touch sensor upon application of an incident force; and an input module configured to:
receive a touch on the touch sensor;
determine a shape of the touch; and
determine an originating side of the touch as the first side based at least in part upon the shape of the touch corresponding to the shaped features.

22. The system of claim 21, wherein the shaped overlay comprises a resilient material.

23. The system of claim 21, wherein the shaped overlay comprises a protective sheet of one side of the two-sided touch sensor.

24. A device comprising:
a two-sided touch sensor having a first side and a second side and configured to accept touch input from the first side and the second side; and
a touch sensor controller coupled to the touch sensor and configured to distinguish touch input from the first side and touch input from the second side and to generate touch output;
wherein the two-sided touch sensor comprises a shared first touch sensor layer between second touch sensor layers, touches from the first side being touches detected based at least in part on a change in an electrical characteristic between at least the first touch sensor layer and a first of the second touch sensor layers and touches from the second side being touches detected based at least in part on a change in an electrical characteristic between at least the first touch sensor layer and a second of the second touch sensor layers.

25. A device comprising:
a two-sided touch sensor having a first side and a second side and configured to accept touch input from the first side and the second side; and
a touch sensor controller coupled to the touch sensor and configured to distinguish touch input from the first side and touch input from the second side and to generate touch output;
wherein the two-sided touch sensor comprises a first touch sensor layer and a second touch sensor layer, touches from the first side being touches detected based at least in part on a change in an electrical characteristic between at least the first touch sensor layer and the second touch sensor layer and touches from the second side being touches detected based at least in part on a change in an electrical characteristic between at least the first touch sensor layer and the second touch sensor layer.

* * * * *